United States Patent [19]
Castoldi

[11] Patent Number: 4,901,512
[45] Date of Patent: Feb. 20, 1990

[54] DYNAMICALLY COMPENSATED ANTI-CLOG MOWING DEVICE

[75] Inventor: Luigi Castoldi, Abbiategrasso, Italy

[73] Assignee: BCS S.p.A., Milan, Italy

[21] Appl. No.: 200,691

[22] Filed: May 31, 1988

[30] Foreign Application Priority Data

Jun. 12, 1987 [IT] Italy ............................... 20892 A/87

[51] Int. Cl.⁴ ............................................. A01D 34/03
[52] U.S. Cl. .......................................... 56/293; 56/296
[58] Field of Search ................. 56/298, 293, 296, 155, 56/246, 248, 307, DIG. 17

[56] References Cited

U.S. PATENT DOCUMENTS

| | | | |
|---|---|---|---|
| 3,401,513 | 9/1968 | Rickerd | 56/298 |
| 3,517,494 | 6/1970 | Beusink et al. | 56/293 |
| 4,387,554 | 6/1983 | Bedogni | 56/296 |

FOREIGN PATENT DOCUMENTS

| | | | |
|---|---|---|---|
| 0222447 | 11/1957 | Australia | 56/296 |
| 0255819 | 7/1967 | Austria | 56/296 |
| 2945960 | 5/1981 | Fed. Rep. of Germany | 56/296 |
| 0656585 | 4/1979 | U.S.S.R. | 56/296 |
| 2103913 | 3/1983 | United Kingdom | 56/246 |

Primary Examiner—Jerome W. Massie
Assistant Examiner—Terry Lee Melius
Attorney, Agent, or Firm—Hedman, Gibson, Costigan & Hoare

[57] ABSTRACT

The invention relates to a mowing device applicable to any type of front cutting or non-front cutting mowing machine, power mower or mower driven by a tractor or other vehicle, comprising a support bar preferably rigidly fixed to the mowing machine frame, and with which there are associated, in a fixed position, guide means for a comb and for a cutting blade which overlies the comb, these latter oscillating in opposite directions longitudinally to said support bar. The comb is provided with teeth which extend forwards and are provided with tangs directed rearwardly and upwardly. Drive means are provided to cause the blade and comb to oscillate in phase opposition so as to dynamically compensate the device wholly or partly, the travel strokes of the blade and comb being preferably inversely proportional to their respective masses, the mass ratio of comb to blade being preferably between 1.5 and 3.

17 Claims, 3 Drawing Sheets

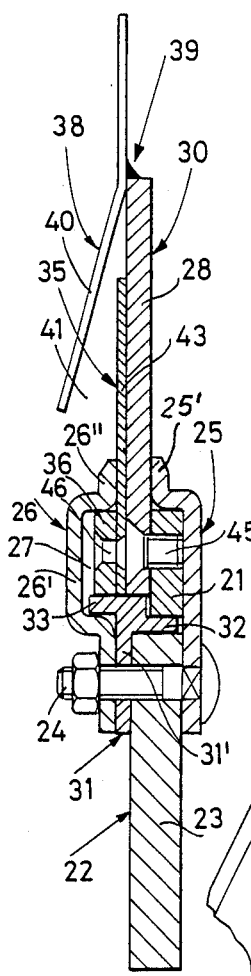
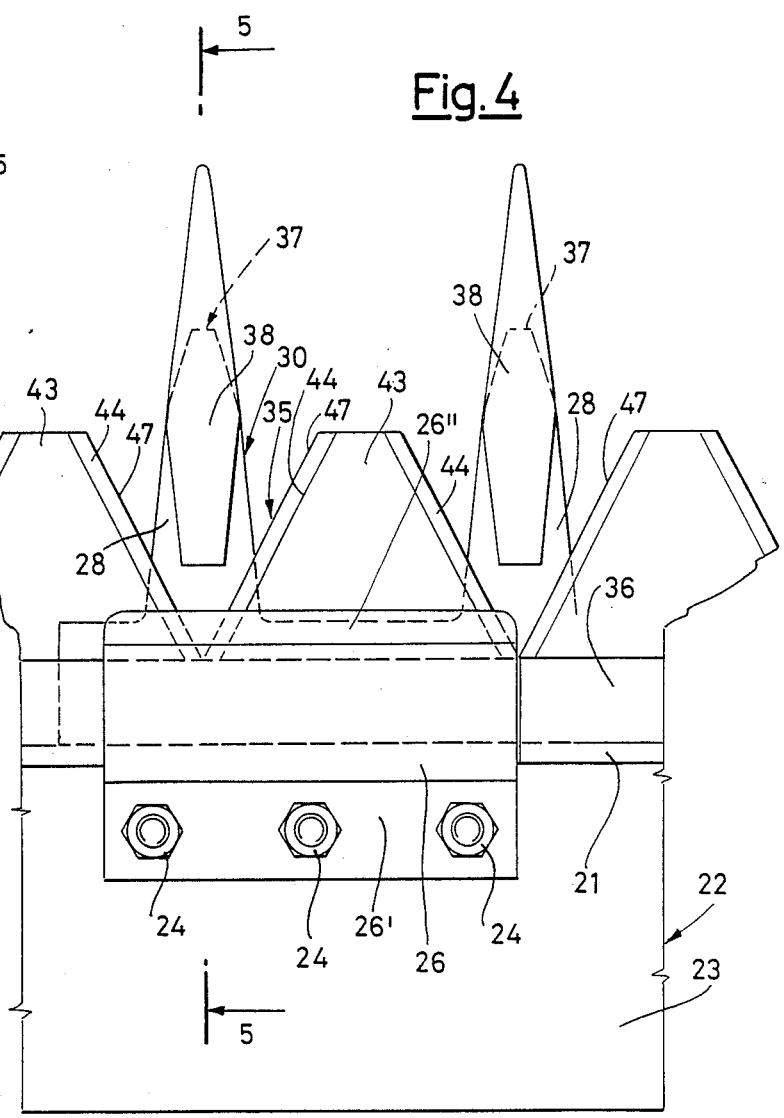
Fig. 5
Fig. 4

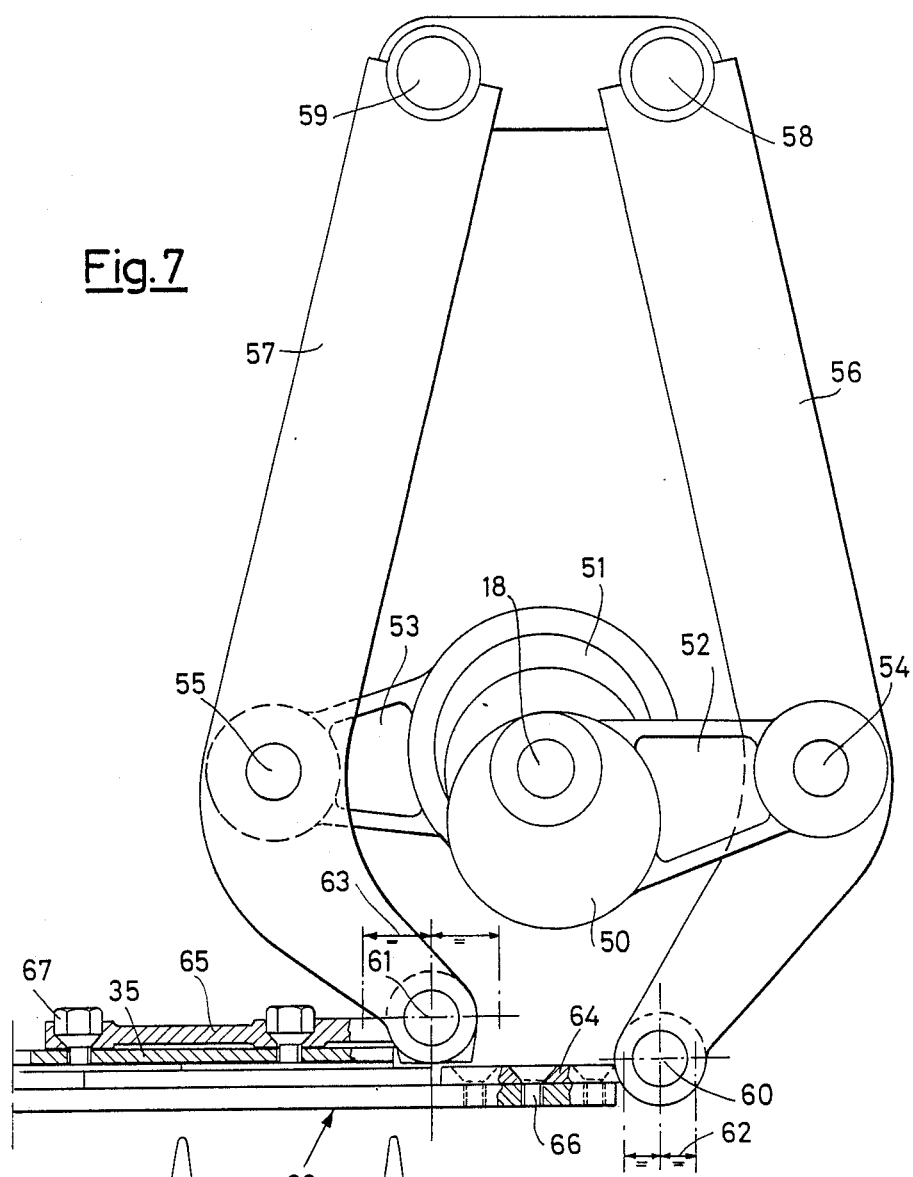
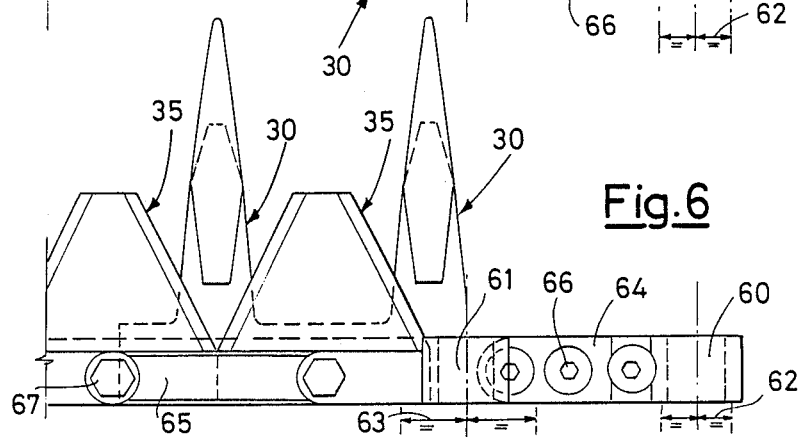

DYNAMICALLY COMPENSATED ANTI-CLOG MOWING DEVICE

FIELD OF THE INVENTION

This invention relates to a mowing device for fitting to power mowers or mowers of any type, which is wholly or partially dynamically compensated and prevents both build-up on the cutter bar, which in conventional anti-clog mowers of the open tooth type often requires the machine to be momentarily stopped in order to clean the comb, and the clogging of the cutting members which takes place in machines of the blade and counter-blade type with a closed-tooth comb.

BACKGROUND OF THE INVENTION

In conventional mowing machines the cutter bar consists of a steel bar of substantial thickness and width (eg. 12 mm thickness and 80 mm width) on which a plurality of teeth are bolted, these teeth being known as grass dividing teeth or sometimes as blade protection teeth, to form a unit known as the comb which is normally mounted rigid with the mowing machine frame.

The purpose of the comb teeth is to divide the grass or other vegetation to be mowed, and to provide a support for the cutting blade, which consists of a steel bar (eg. of 20 mm width and 6 mm thickness) on which a plurality of triangular or trapezoidal knives with sharp lower-surface edges are riveted so that they rest with sliding reciprocating movement on the upper surfaces of the teeth.

The teeth also carry an upwardly and rearwardly directed tang the purpose of which is to counteract the bending effect of the blade and the upper surface edges of the teeth in order to straighten the grass being out.

Teeth of this type can be considered as open anti-clog teeth because as the tang is inclined upwards in a rearward direction, the blade passage space between the upper surface of the teeth and the relative tang increases rearwards with the result that the grass entrained between the rear of the blade and the tang is readily expelled rearwards and therefore cannot cause clogging (ie cannot jam between the blade and teeth).

Conventional mowing machines have however the serious drawback that in the case of grass lying horizontally or tangled because of rain and wind, or if small lumps of organic or other material are encountered, the fact that the comb is fixed means that the comb teeth have difficulty in penetrating the grass to be cut, and this tends to be pushed forwards so that it accumulates on the point of the comb teeth so building up on the teeth and requiring momentary machine stoppages for the necessary comb cleaning. Conventional mowing machines therefore do not clog but instead suffer build-up, in addition to undergoing annoying and damaging vibration.

A problem well known to the expert of the art is that of bar vibration deriving from the reaction of the blade reciprocating motion and tending to extend to the frame. A well known solution to this problem is to connect the bar to the frame not rigidly but instead by articulated arms which together with the bar and frame form an articulated parallelogram. This solution was proposed for the first time in Italian Pat. No. 399,989. It was later improved as described in Italian Pat. Nos. 506,608 and 536,151.

In all machines incorporating this solution, the cutter bar is free to oscillate parallel to itself relative to the frame, this oscillation occurring by reaction to the reciprocating motion of the blade, so producing dynamic balancing of the mowing device to eliminate or at least considerably reduce the vibration transmitted to the frame. The bar oscillations have a much smaller amplitude than the blade stroke as the mass of the bar, for obvious mechanical requirements, is much greater than that of the blade, normally to the extent of 10:1 or more.

However these devices do not adequately solve a further problem, namely the build-up which occurs in conventional mowing machines. In this respect, as the comb mass is 10 or more times the blade mass, the oscillation amplitude of the comb is 10 or more times smaller than that of the blade and thus so small that in the case of grass horizontally lying or twisted due to wind and rain, the disturbance to the grass caused by the teeth of the comb which oscillates by reaction is not sufficient to keep the comb clean with the result that it blocks up and pushes the grass forwards so requiring frequent stopping for the necessary cleaning of the comb. Mowing machines of this type therefore do not clog or vibrate, but have the tendency to suffer build-up.

A further known method of dynamically balancing the mowing device and simultaneously solve the build-up and clogging problem is to use two blades which move in opposite directions, acting in the manner of shears. In this case the two blades, which are substantially identical and kept pressing against each other by suitable means, are supported and guided by a support bar rigidly connected to the frame, and in order to undergo opposing oscillation are operated by connecting rod-crank linkages or the like.

Such devices however do not produce an always acceptable cut because when the cutting edge of the two blades becomes rounded due to wear or when the means which press the blades together become slack, or again if any knives of the system deform due to impact or the like, the grass bends over between the two blades and becomes more torn than cut, as happens in the case of normal shears. Mowing machines of this type therefore do not suffer build-up, clogging or vibration, but undergo rapid deterioration of cutting quality and require costly maintenance.

To obviate these drawbacks, devices comprising a blade and counter-blade have been proposed in which a support bar of considerable thickness and width (eg. 80×12 mm) is provided and comprises guides in which the blade and counter-blade slide under oscillation, they being of substantially equal weight and driven by connecting rod-crank linkages or the like to produce opposing oscillatory motion of equal amplitude. Consequently, although the blade has a normal triangular or trapezoidal flat knife structure, the counter-blade or comb consists of two facing parallel elements spaced apart by a distance little greater than the thickness of the blade knives, so as to create a slit in which the blade knives slide in the manner of a guillotine.

One of the two elements of the counter-blade or comb, namely the lower one on which the blade knives slide with their lower sharp-edged surface, is sharpened to produce the cutting action in cooperation with said knives, whereas the other element only acts in a counteracting manner to straighten the grass being cut. The two counter-blade or comb elements have a plan shape similar to that of the comb teeth of conventional mowing machines and have their ends joined so that the slits in which the blade slides are closed at their front and rear. A device of this type is described for example in Spanish utility model 291,595.

Said devices of the blade and comb or double counter-blade type do not suffer build-up as the ends of the counter-blade undergo wide oscillatory movement and produce a good cut even if the knives are not properly sharpened or if there is a small gap between the sharpened parts of the blade and counter-blade, but have the serious drawback of undergoing clogging of the cutting system. In this respect, it is clear that as the blade knives are sharpened only on one face and the counter-blade is sharpened only on the element along which the knife cutting edges slide, no cutting action can take place between the opposite or rear face of the knives and that counter-blade element facing it. As the knife edges are of the stated wedge shape and taper from the top of their rear to the cutting edge, the grass is easily entrained in part between said rear and the facing element of the counter-blade and becomes tightly packed there, to produce clogging which results in a pressure which is sometimes so high as to deform the counter-blade elements. Even if such deformation does not occur, the relative movement of the blade and counter-blade is always strongly hindered by the frictional resistance produced by the clogging material, with consequent increased power requirement and greater mechanical stress in the motion transmission members. Mowing machines of this type consequently do not suffer build-up or vibration but clog to a serious extent.

In conclusion, no known mowing device is able simultaneously to provide dynamic balancing with wholly or partially elimination of vibration transmission to the frame, an always acceptable cut even if the knives are imperfectly sharpened and/or a gap exists between them and the elements on which they slide, and elimination of build-up in the comb and clogging of the cutting members.

An object of the present invention is to provide a mowing device which obviates all the aforesaid drawbacks while offering all the said advantages.

A further object of the invention is to provide a mowing device which minimizes the forces involved in transmitting motion to the cutting members, possesses maximum rigidity and results in minimum power consumption.

A further object of the invention is to provide a mowing device which operates regularly and reliably and in which working interruptions and maintenance are minimized.

A further object of the invention is to provide a mowing device which is highly efficient under all the said aspects, is of simple and robust construction, and is of low cost.

Further objects and advantages of the invention will be apparent from the description of a preferred embodiment given hereinafter.

SUMMARY OF THE INVENTION

The mowing device of the invention is characterized by comprising, in combination with a support bar connected preferably rigidly to the mowing machines frame, and with guide means in fixed positional relationship thereto and longitudinal thereto, a comb slidable longitudinally with reciprocating motion and guided in its movement by said guide means, and provided with teeth which extend forwards in the working direction of the device, a cutting blade provided with knives, which is slidable longitudinally and guided in its reciprocating movement by said guide means and which overlies at least part of said comb, and drive means for causing said blade and comb to oscillate opposingly with strokes which differ in proportion preferably inverse to their respective masses, so as to balance as far as practicable the respective forces of inertia. The ratio of the mass of said comb to the mass of said blade is between 1.5 and 3.5 and preferably between 1.5 and 3, and the ratio of the comb stroke to the blade stroke is preferably the inverse of the ratio of the comb mass to the blade mass, wherein both the blade mass and the comb mass include a portion of the masses of the reciprocable driving members in correlation with the motion amplitude of their several component parts.

Once that a balance is obtained, as deriving from the counteracting inertial forces for a mowing machine having a determined blade and comb length, should one desire to obtain the same degree of balance with a blade and comb assembly of a different length and thus with different masses, also the masses of the several driving members ought to be varied proportionally, but this would be neither practical nor economically acceptable, inasmuch as it has been ascertained that with driving members suited to a blade having a length comprised between a minimum and a maximum, a comfortable balancing can still be achieved.

In a preferred embodiment of the invention, the support bar comprises a steel base bar for example 12 mm thick and for example 80 mm wide, and elements rigid therewith for determining a box section housing the blade and comb.

Preferably the cutting blade comprises a base strip for example 6 mm thick and for example 20 mm wide, to which the knives are fixed, and the comb comprises a base strip, for example 8 mm thick and and 30 mm wide, to which the teeth are fixed. The guide means comprise at least one longitudinal guide element parallel to said base strips of the blade and comb and forming a surface on which these latter can slide. Preferably said elements rigid with the support bar base strip comprise a suitably shaped lower plate supporting the comb, and a suitably shaped upper plate which pushes the blade knives against the comb teeth, said guide plates being replaceable by a plurality of small-length plates of equal section. The tang with which each tooth is provided is inclined upwards in a rearward direction to determine with the respective tooth a space the cross-section of which increases rearwards and into which the respective blade knife penetrates.

As the blade passage space between the tooth base and tang increases in a rearward direction there is no clogging because any grass entrained between the rear of the blade and the tang is readily expelled rearwards.

Preferably, the blade and comb drive means consist of connecting rod-crank linkages, the cranks being conveniently driven by the same shaft. The knives are provided with wedge-tapering edges so as to present lower-surface cutting edges which slide on the upper surface of the comb teeth. Conveniently, said tangs are applied to the teeth and fixed for example by welding. Various elements and expedients known for other mowing machines can be applied to the device of the invention, as will be apparent to an expert of the art, even if no explicit mention is made thereof in the description given hereinafter.

The mowing machines incorporating the device of the invention also form part of the invention itself, whether these are power mowers, or mowing machines to be towed or carried by an agricultural vehicle and operated by a power take-off therefrom. Other alternative and/or preferred characteristics of the invention will be apparent from the embodiment described hereinafter with reference to the accompanying drawings.

This embodiment relates to a self-propelled power mower of the front cutting type, provided with its own motor, an operator seat and a steering wheel. It is however apparent that the invention, which relates to the mowing device, is independent of the structure or operation of any other part of the machine, and is therefore applicable as stated to mowing machines of any type.

Likewise, the described embodiment shows a front-positioned mowing device but the invention is also applicable to a laterally positioned and possibly inclinable device, and generally to a mowing device of any position connected to any frame. As the mowing device of the invention is wholly or partially dynamically compensated, it is preferably connected rigidly to the frame by the support bar, but the invention can be applied to a device the support bar of which is connected to the frame not rigidly but for example articulatedly and/or elastically.

BRIEF DESCRIPTION OF THE DRAWING

In the accompanying drawings:

FIG. 4 is a diagrammatic plan view of a central portion of the mowing device;

FIG. 5 is a section on the line 5—5 of FIG. 4;

FIG. 6 is a diagrammatic plan view of that end of the mowing device connected to the drive linkage, the support bar and relative guide means being omitted for ease of illustration;

FIG. 7 is a front view of the elements of FIG. 6 plus the drive linkage.

DETAILED DESCRIPTION OF THE INVENTION

Figure 1:
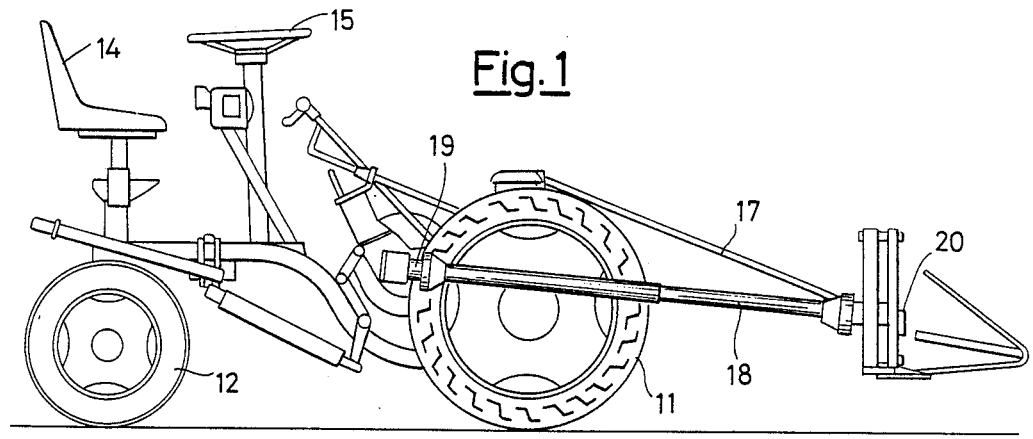
FIG. 1 is a diagrammatic side view of a power mower incorporating one embodiment of a mowing device according to the invention.
Figure 2:
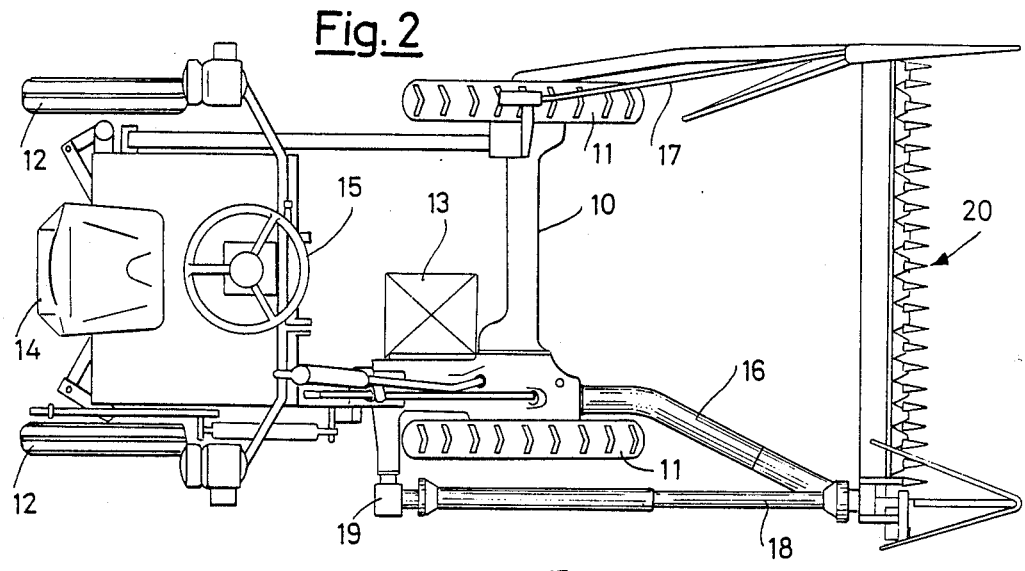
FIG. 2 is a plan view of the same machine.
Figure 3:
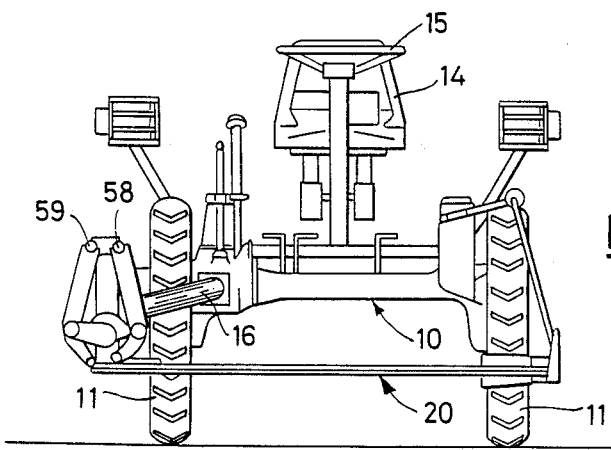
FIG. 3 is a front view of the same machine.

As can be seen from FIGS. 1-3, the particular example illustrated relates to a front cutting power mower, with a frame indicated overall by 10 which is supported by two front drive wheels 11 and two steered rear wheels 12, and carries the motor 13, the seat 14 and the steering members operated by a steering wheel 15. The body of the frame extends frontwards in the form of a rigid arm 16, but this could be dispensed with or replaced by a different element, and the frame could in fact have any desired structure. The assembly comprising the support bar, comb and blade is indicated diagrammatically in FIGS. 1-3 by the reference numeral 20. The reference numeral 17 indicates a second arm connecting the support bar to the body of the frame. The reference numeral 18 indicates the drive shaft for the blade and comb, which is operated by the motor through a coupling 19 and supported at its front by any convenient support carried by the arm 16, but could be fixed to the frame in any position and in any convenient manner.

With reference to FIGS. 4 and 5, the support bar indicated overall by 22 comprises a robust steel base strip 23. This can be between 10 mm and 15 mm thick and have a width (in the working direction of the mowing machine) of 60 mm and more, depending on its length. Two profiled, preferably steel plates 25 and 26 defining a contained space 27 of box section and formed by pressing, rolling, profiling or other means are fixed by bolts 24 to the bar 23. These profiled plates can extend along the entire length of the support bar, but this is not necessary and they can be divided into numerous pieces, such as that indicated in FIG. 4, and positioned at convenient intervals.

The lower profiled plate 25 comprises a flat part which is clamped by bolts 24 against the base strip 23 of the bar structure 22 and supports a strip 21 representing the base strip of the comb, indicated overall by 30. This plate is bent upwards to form a horizontal edge 25' on which the base of the teeth 28 of the comb 30 slide. The upper profiled plate 26 comprises a horizontal portion which is clamped by the bolts 24 against a guide indicated overall by 31 and described hereinafter, and is then bent upwards to form a second horizontal portion 26', and finally bent downwards to form an edge 26" acting as a blade presser, ie it presses the knives of the blade 35, described hereinafter, against the comb teeth 28. The guide 31 comprises a horizontal portion 31' clamped by the bolts 24 between the upper profiled plate 26 and the base 23 of the support bar 22, and two shoulders at a right angle to the portion 31' and indicated by 32 and 33.

Said shoulder 32 is interposed between the front edge of the base strip 23 of the support bar 22 and the rear edge of the base strip 21 of the comb 30. In this manner it acts as a guide for the comb 30. In contrast, said shoulder 33 acts as a guide for the rear edge of the base strip 36 of the blade 35. As stated, the comb 30 comprises a base strip 21 and teeth 28 fixed to it by screws 45. The teeth are of triangular shape, or more exactly approximately trapezoidal with a front chamfer indicated at 37. Their exact profile can however be varied as required, provided this is generally elongated and tapering forwards.

In the illustrated embodiment they are provided with tangs 38 fixed on by welds 39 and bent upwards in a rearward direction at 40 to form with the remaining parts of the device an empty space 41 of wedge section which is open rearwards to allow ready exit of grass or other material from the space 41. The tang is preferably shorter than that part of the respective tooth which emerges from the box section of the support bar. One tang is provided for each tooth and is bent upwards at its rear, but it can also be different from that shown and form one piece with the tooth, be rounded, be of non-metallic material etc., and in general any one of the many tooth and tang structures known to the expert of the art can be used.

The cutting blade 35 comprises a base strip 36 to which, by means of rivets 46, there are fixed the knives 43 which are provided with edges 44 tapering in wedge manner downwards to form cutting edges 47 which slide on the upper face of the teeth 28. Essentially, the cutting blade is structured in accordance with the known art, in any convenient manner.

With reference now to FIGS. 6 and 7 in which, as stated, all the constituent elements of the support bar and blade and comb guide means have been removed, including the plates 25, 26 and guide 31, cams 50 and 51 keyed onto the shaft 18 drive two connecting rods 52, 53 pivoted at 54, 55 to two rocker arms 56, 57. The two rocker arms are each pivoted at one end at 58, 59 to a point which is fixed with respect to the arm 16 (and thus with respect to the frame). At their other end the rocker arm 56 is pivoted at 60 to the end of a plate 64 fixed by screws —66 to one end of the comb 30, and the rocker arm 57 is pivoted at 61 to the end of a plate 65 fixed by screws 67 to the corresponding end of the blade 35 to allow its rapid removal. The travel strokes of the comb and blade are indicated by 62 and 63 and are for example 25 and 51 mm respectively.

In the indicated example, the former is about one half the latter because the comb weight is about double the blade weight. Generally, as stated, the blade and comb travel strokes are in a ratio which is approximately the inverse of their mass ratio, so as to provide the desired dynamic balance.

I claim:

1. A mowing device for mowing machines, comprising a support bar, a comb assembly oscillatable longitudinally of said support bar and provided with elongated teeth extended forwardly in the working direction of the machine, a blade assembly oscillatable longitudinally of said support bar and provided with knives overlying a rear portion of the teeth of said comb assembly, guide surfaces in rigidly-fixed positioned relationship to said support bar and extending longitudinally thereto, a guided surface forming a part of the comb assembly, a guided surface forming a part of the blade assembly, said guided surfaces being in sliding engagement with said guide surfaces, whereby said comb assembly and blade assembly are positively guided to oscillate parallel to said guide surfaces, and means for driving said comb assembly and blade assembly to oscillate in opposite directions.

2. A device as claimed in claim 1, wherein the stroke of the comb and of the blade assembly are in a ratio comprised between 90% and 110% of the inverse of the ratio between their respective masses.

3. A device as claimed in claim 1, wherein the mowing device further comprises a frame, said support bar being rigidly connected to the frame.

4. A device as claimed in claim 1, wherein the comb teeth are provided with rearwardly and upwardly directed tangs.

5. A device as claimed in claim 4, wherein the tang is upwardly inclined rearwards to define with the respective tooth a wedge-shape space into which the respective blade knife penetrates.

6. A device as claimed in claim 4, wherein the tang is shorter than that part of the respective tooth which emerges from a box section of the support bar, so as to leave an open space above the respective knife in order to facilitate material discharge from said wedge-shaped space.

7. A device as claimed in claim 4, wherein the tangs of the comb teeth are applied to the respective teeth and fixed thereto preferably by welding.

8. A device as claimed in claim 1, wherein the elements rigid with the support bar comprise a shaped upper plate which presses the blade knives against the comb teeth.

9. A device as claimed in claim 1, wherein the blade and comb drive means comprises connecting rod-crank linkages preferably operated by the same shaft.

10. A device as claimed in claim 1, wherein the blade knives are provided with wedge-tapered edges so as to form cutting edges which slide on the surface of the comb teeth.

11. A device as claimed in claim 1, wherein the mass ratio of the comb assembly to the blade assembly is between 1.5 and 3.5.

12. A device as claimed in claim 11, wherein the mass ratio of the comb assembly to the blade assembly is between 1.5 and 3.

13. A device as claimed in claim 1, wherein said driving means impart to the comb and blade assemblies strokes that are approximately inversely proportional to their respective masses.

14. A device as claimed in claim 1, comprising elements rigidly connected to the support bar, which define a box section, housing said guide surfaces and said guided surfaces.

15. A device as claimed in claim 1, wherein the blade assembly comprises a base strip, knives fixed thereto, and a further element defining said guided surface of said blade assembly.

16. A device as claimed in claim 1, wherein the comb assembly comprises a base strip, teeth fixed thereto, and a further element defining said guided surface of said comb assembly.

17. A front cutting power mower comprising:
(a) a frame housing a mowing device;
(b) motor means for moving said power mower and operating the mowing device; and
(c) said mowing device comprising a support bar, a comb assembly oscillatable longitudinally of said support bar and provided with elongated teeth extended forwardly in the working direction of the machine, a blade assembly oscillatable longitudinally of said support bar and provided with knives overlying a rear portion of the teeth of said comb assembly, guide surfaces in rigidly-fixed positioned relationship to said support bar and extending longitudinally thereto, a guided surface forming a part of the comb assembly, a guided surface forming a part of the blade assembly, said guided surfaces being in sliding engagement with said guide surfaces, whereby said comb assembly and blade assembly are positively guided to oscillate parallel to said guide surfaces, and means for driving said comb assembly and blade assembly to oscillate in opposite directions.

* * * * *